United States Patent
Chen et al.

(10) Patent No.: US 11,189,045 B2
(45) Date of Patent: Nov. 30, 2021

(54) FOCAL SPOT AUTO-CALCULATION ALGORITHM

(71) Applicant: National Yang Ming Chiao Tung University, Taipei (TW)

(72) Inventors: Jyh-Cheng Chen, Taipei (TW); Suei-Ting Jhao, Taipei (TW)

(73) Assignee: NATIONAL YANG MING CHIAO TUNG UNIVERSITY, Taipei (TW)

( * ) Notice: Subject to any disclaimer, the term of this patent is extended or adjusted under 35 U.S.C. 154(b) by 0 days.

(21) Appl. No.: 16/677,201

(22) Filed: Nov. 7, 2019

(65) Prior Publication Data

US 2021/0142502 A1 May 13, 2021

(51) Int. Cl.
| | | |
|---|---|---|
| *G06K 9/46* | (2006.01) | |
| *G06T 7/136* | (2017.01) | |
| *G06T 7/62* | (2017.01) | |
| *G06T 7/60* | (2017.01) | |
| *G06T 7/11* | (2017.01) | |

(52) U.S. Cl.
CPC .............. *G06T 7/60* (2013.01); *G06K 9/4647* (2013.01); *G06T 7/11* (2017.01); *G06T 7/136* (2017.01); *G06T 7/62* (2017.01); *G06T 2207/10116* (2013.01)

(58) Field of Classification Search
CPC ... G06T 7/60; G06T 7/136; G06T 7/11; G06T 2207/10116; G06T 7/62; G06K 9/4647
See application file for complete search history.

(56) References Cited

U.S. PATENT DOCUMENTS

| | | | | |
|---|---|---|---|---|
| 4,132,654 A | * | 1/1979 | Braun ..................... | H01J 35/14 378/207 |
| 7,249,886 B1 | * | 7/2007 | Chao ..................... | A61B 6/037 378/113 |
| 2010/0158318 A1 | * | 6/2010 | Snoeren ................... | H05G 1/26 382/106 |

OTHER PUBLICATIONS

Nickoloff, Edward. "X-ray Tube Focal Spot Size, Digital Detectors, Imaging System Aperture and Spatial Resolution." Proc. SPIE 8668, Medical Imaging 2013: Physics of Medical Imaging 86685S, Mar. 6, 2013, 11 pages (Year: 2013).*

* cited by examiner

*Primary Examiner* — Jon Chang
(74) *Attorney, Agent, or Firm* — Muncy, Geissler, Olds & Lowe, P.C.

(57) ABSTRACT

The present invention relates to a process for evaluating the characteristics of the focal spot of an X-ray tube. This algorithm can be used to obtain the size of fuzzy zone and focal spot size in all directions, and the average value thereof can be automated to replace cumbersome manual operations and reduce human error. The algorithm can be used to automatically obtain the size of fuzzy zone and focal spot size in each direction, as well as their average value, thus replacing cumbersome manual operations and reducing personal error.

6 Claims, 9 Drawing Sheets

FOCAL SPOT AUTO-CALCULATION ALGORITHM

BACKGROUND OF THE INVENTION

Technical Field of the Invention

The present invention relates to a process for simply and quickly evaluating the characteristics of the focal spot of an X-ray tube.

Background

In the application of high-energy flash radiography, the X-ray source comes from the bremsstrahlung radiation generated by accelerating, transporting and focusing an electron beam pulse onto a heavy-metal target. The quality of acquired image is closely related to the size of the source spot, which is often quoted as an evaluation of the resolving power of a particular flash-radiography machine.

Focal spot is the area on the anode of an X-ray tube or the target of an accelerator that is struck by electrons and from which the resulting X-rays are emitted. The focal spot size is the focal spot area projected perpendicularly onto the image receptor, and strongly depends on the electron beam size and the scattering of electrons and photons within the target. A good knowledge of the size and the shape of the source spot is of great importance not only to the inversion of the material density but also to the design optimization of the target.

Measurements of focal spot sizes are essential during acceptance testing and are occasionally performed during image quality evaluation of clinical radiographic systems. The shape and size of a focal spot influence the resolution of a radiographic image. An increase in focal spot size, which may accompany deterioration of the x-ray tube, reduces the ability to define small structures.

For evaluation of the focal spot sizes, a method "focal spot star radiogram" suggested by the IEC 60336:2005 standard could be used. The focal spot size could be derived from the size of fuzzy zone. However, the size of the fuzzy zone must be measured manually, which is time consuming in practical application and cannot be automated.

The purpose of this automated focal spot calculation algorithm is to simplify a series of cumbersome focal spot size testing process, and to quickly obtain the calculation results, which can improve the time-consuming, labor-intensive, and personal error caused by manual determination of the fuzzy zone size in the traditional method.

SUMMARY OF INVENTION

Accordingly, the present invention provide a method for evaluation of the focal spot sizes from a star pattern radiogram, comprising: determining the center of the star pattern radiogram; deploying a plurality of straight lines along the radius of the star pattern radiogram; selecting one of the straight lines and reading the intensity values along the selected straight line to obtain an intensity function of radial coordinate; performing binarization on the intensity values to obtain a pixel value function of radial coordinate; performing regression on the pixel value function of radial coordinate to obtain a regression function; obtaining a first differential function from the derivative of regression function respect to radial coordinate; determining the local maximum and local minimum of the first differential function; documenting the radial coordinate of local maximum or local minimum to obtain the size of fuzzy zone (Z); and obtaining a focal spot size along the direction of the straight line using formula I:

$$\text{Focal spot size}(f) = (\theta/57.3) * [(Z*R)/(M-1)] \quad \text{(I)}$$

wherein Z is the size of fuzzy zone; θ is the vertex angle of star pattern, R is the pixel size of detector; M is the magnification.

In some embodiments, the total number of local maximum and local minimum is not 1, the focal spot size can be obtained by selecting another straight line and repeat the process.

In some embodiments, the regression is linear or non-linear regression.

In some embodiments, the regression is polynomial regression.

In some embodiments, the regression is sextic polynomial regression.

In some embodiments, the regression step comprises excluding outliers which the mean square error (MSE) more than a threshold.

DETAILED DESCRIPTION OF THE INVENTION

The other characteristics and advantages of the present invention will be further illustrated and described in the following examples. The examples described herein are using for illustrations, not for limitations of the invention.

The Star pattern consists of an array of alternating high and low absorbing wedges. The high absorbing wedges shall be made of lead or an equivalently absorbing material and shall have a thickness of 0.03 mm to 0.05 mm. All wedges shall have a vertex angle θ equal to or less than 0.035 rad (approximately 2°).

Binarization is a process of image segmentation that converts a grayscale image to a binary image. The simplest thresholding methods replace each pixel in an image with a black pixel if the image intensity is less than some fixed constant, or a white pixel if the image intensity is greater than that constant.

EXAMPLE

Figure 1:
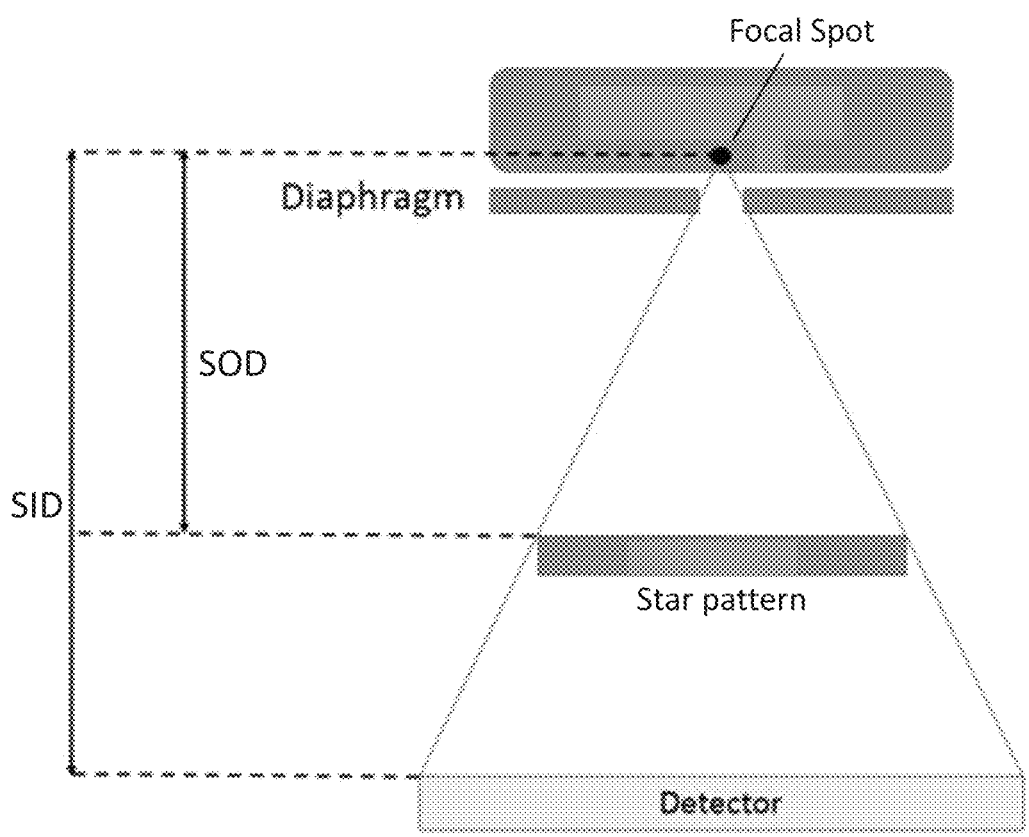
FIG. 1 shows the essential dimensions of the star test pattern.
Figure 2:
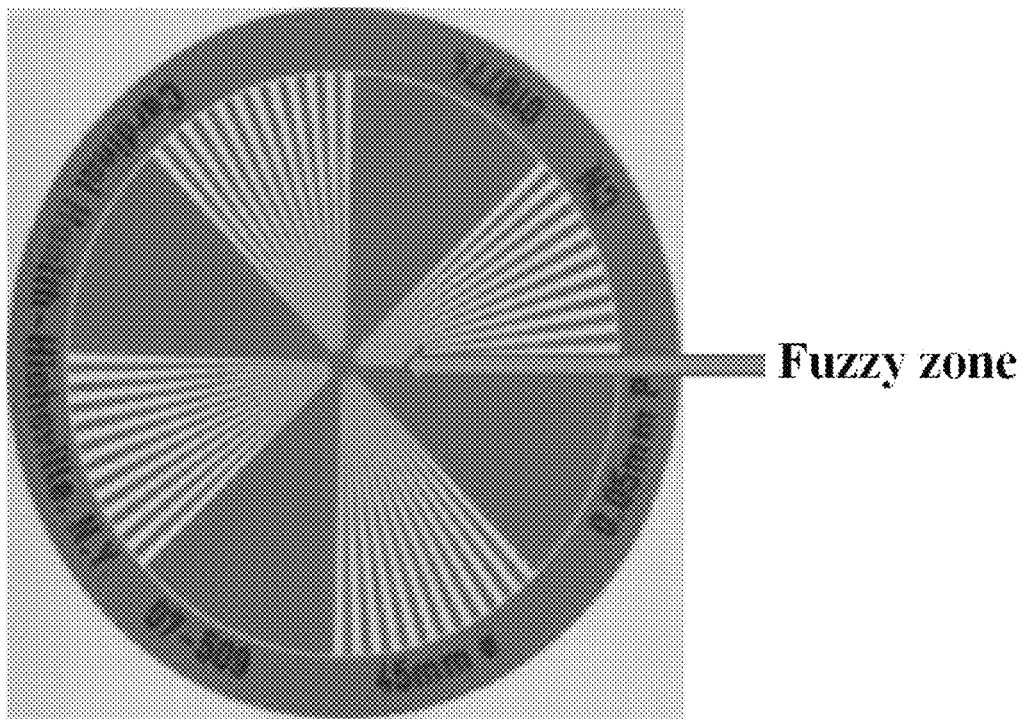
FIG. 2 shows the radiographic image of star pattern.

This algorithm deals with the production of focal spot star radiograms as used for the determination of the size of the focal spots. The voltage, current time product, and standard magnification are selected based on the tube being tested; wherein, the SID is the distance from the light source to the image detector, and the SOD is the distance from the light source to the star pattern (as shown in FIG. 1). The resulting radiographic image is shown in FIG. 2.

Figure 3:
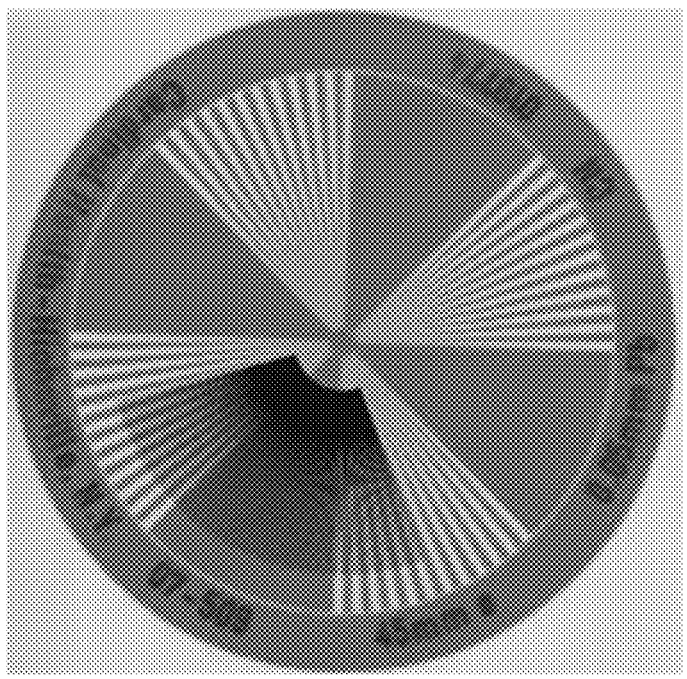
FIG. 3 shows the straight lines deployed along the radius of the star pattern radiogram.
Figure 4:
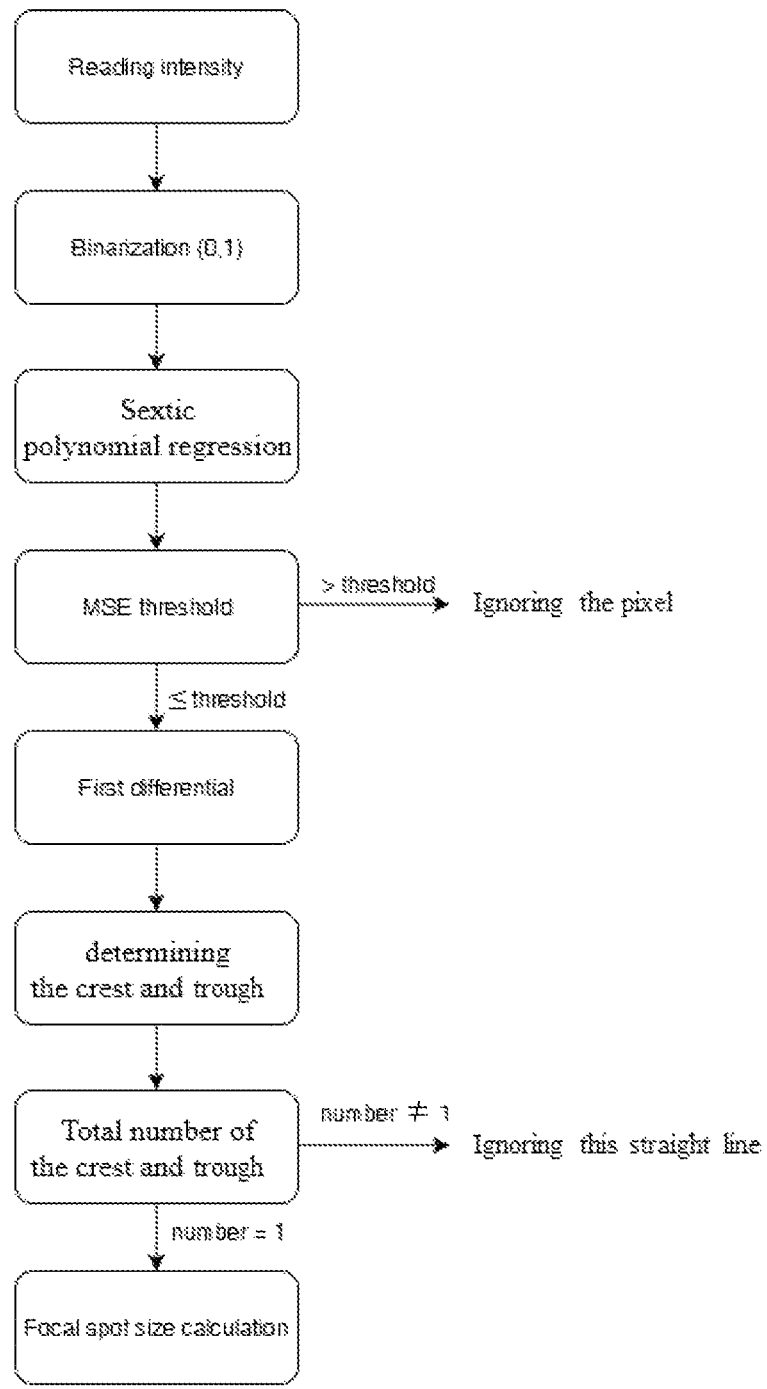
FIG. 4 shows the flow chart of focal spot auto-calculation algorithm for each straight line.
Figure 5:
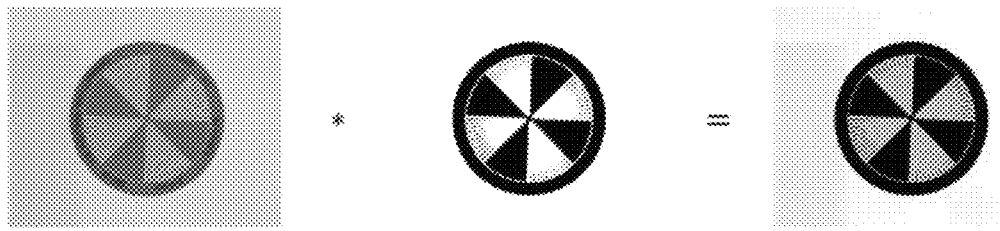
FIG. 5 shows binarization of the radiographic image of star pattern.
Figure 6:
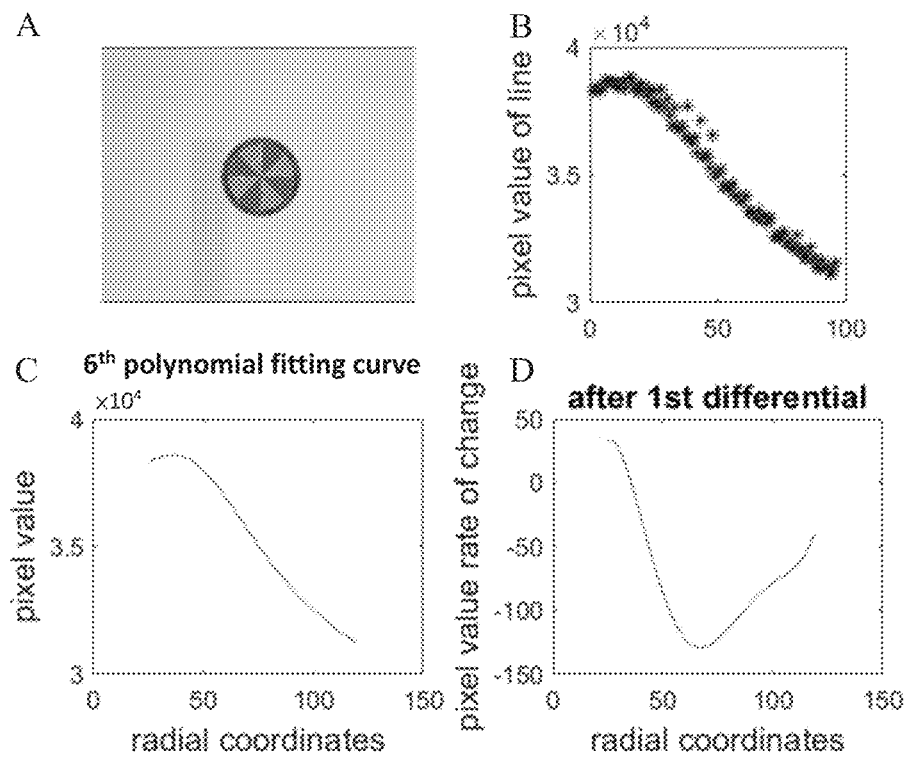
FIG. 6 shows the analysis of 1st straight line for size of fuzzy zone. (A) star pattern image, (B) pixel value of 1st straight line, (C) sextic polynomial regression, (D) first differential of sextic polynomial regression.
Figure 7:
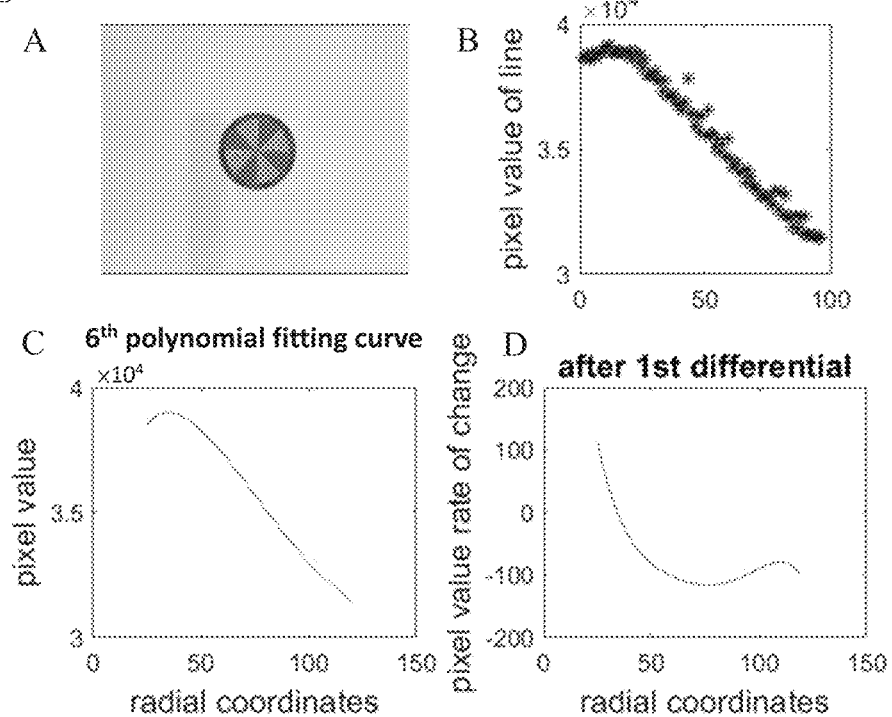
FIG. 7 shows the analysis of 2nd straight line for size of fuzzy zone. (A) star pattern image, (B) pixel value of 2nd straight line, (C) sextic polynomial regression, (D) first differential of sextic polynomial regression.
Figure 8:
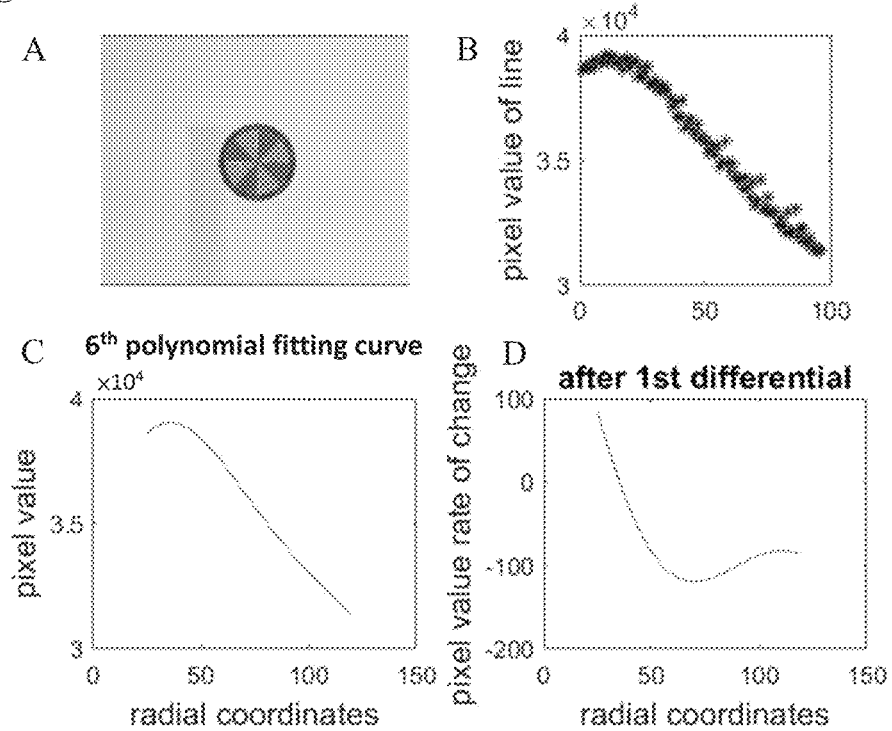
FIG. 8 shows the analysis of 3rd straight line for size of fuzzy zone. (A) star pattern image, (B) pixel value of 3rd straight line, (C) sextic polynomial regression, (D) first differential of sextic polynomial regression.
Figure 9:
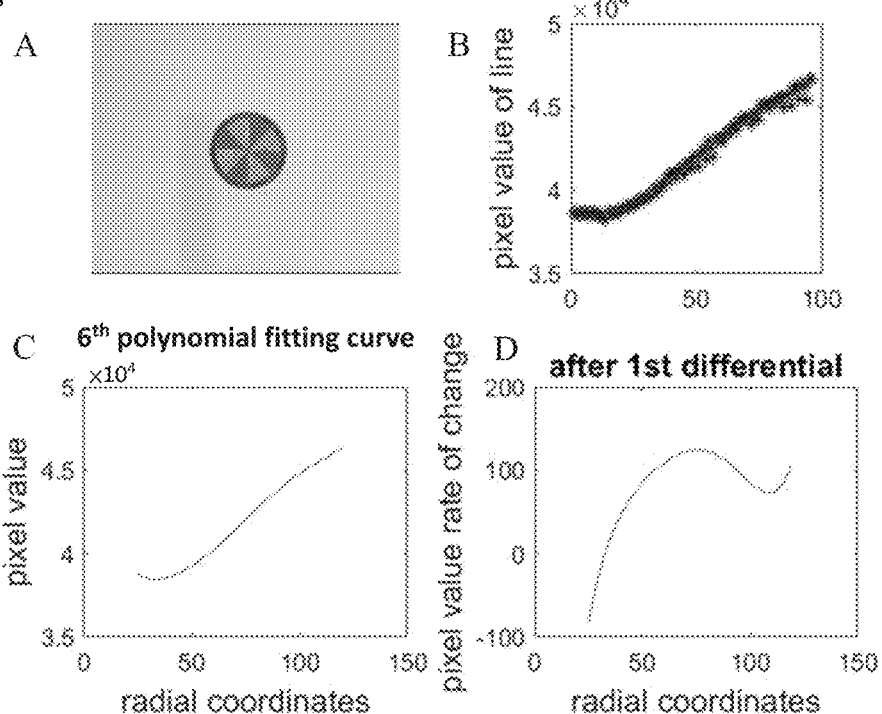
FIG. 9 shows the analysis of 4th straight line for size of fuzzy zone. (A) star pattern image, (B) pixel value of 4th straight line, (C) sextic polynomial regression, (D) first differential of sextic polynomial regression.
Figure 10:
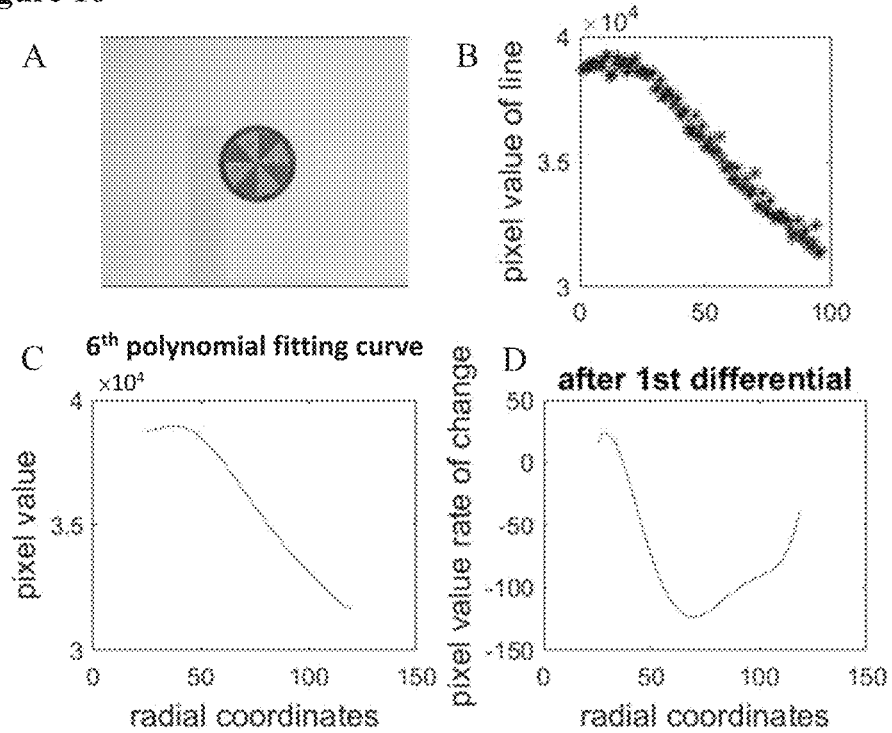
FIG. 10 shows the analysis of 5th straight line for size of fuzzy zone. (A) star pattern image, (B) pixel value of 5th straight line, (C) sextic polynomial regression, (D) first differential of sextic polynomial regression.
Figure 11:
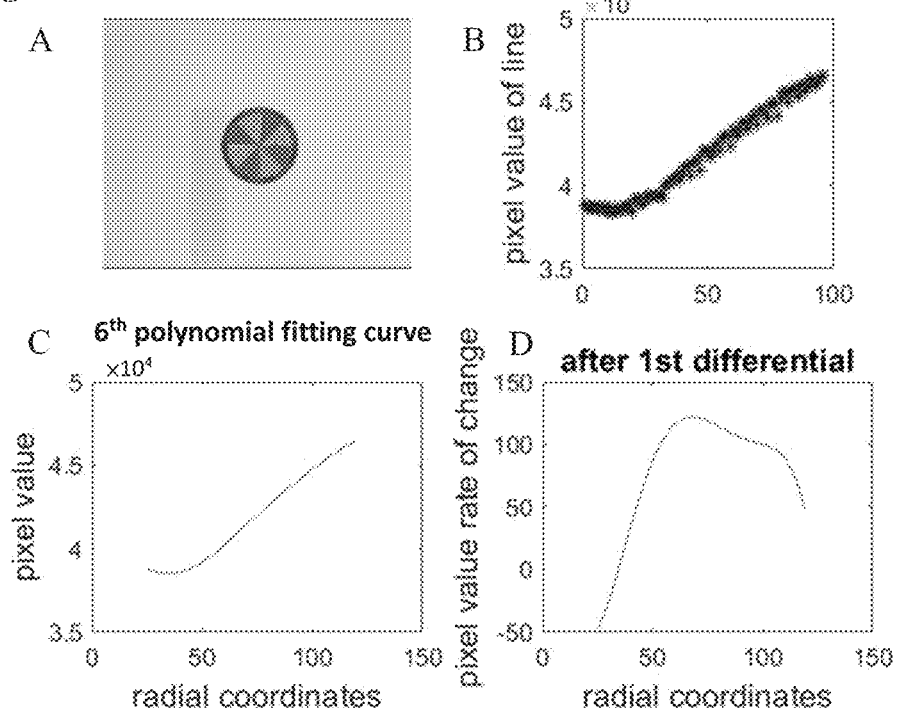
FIG. 11 shows the analysis of 6th straight line for size of fuzzy zone. (A) star pattern image, (B) pixel value of 6th straight line, (C) sextic polynomial regression, (D) first differential of sextic polynomial regression.
Figure 12:
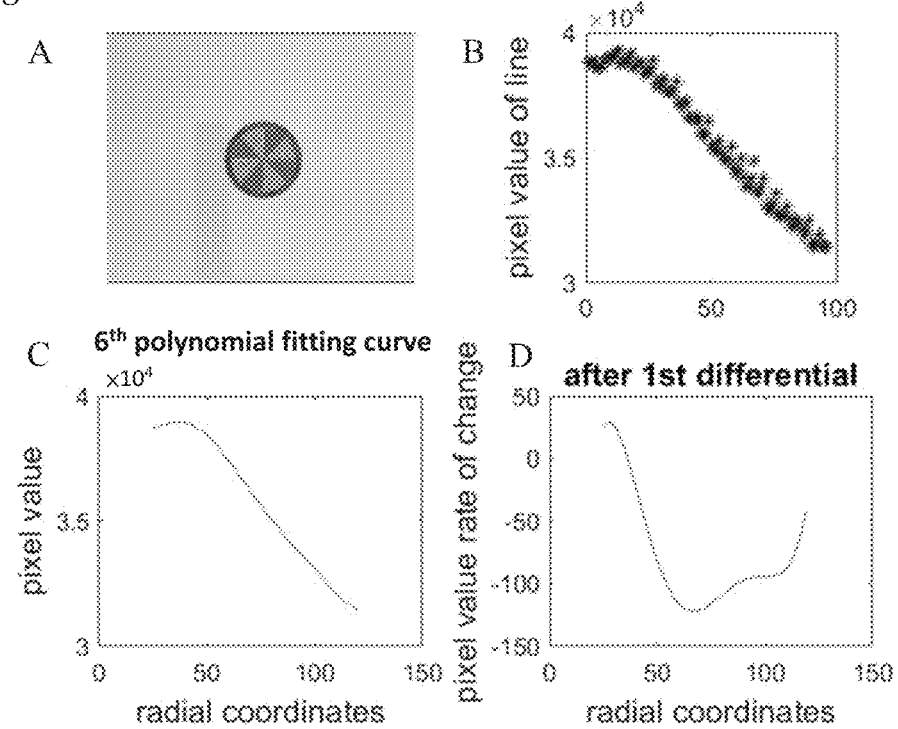
FIG. 12 shows the analysis of 7th straight line for size of fuzzy zone. (A) star pattern image, (B) pixel value of 7th straight line, (C) sextic polynomial regression, (D) first differential of sextic polynomial regression.
Figure 13:
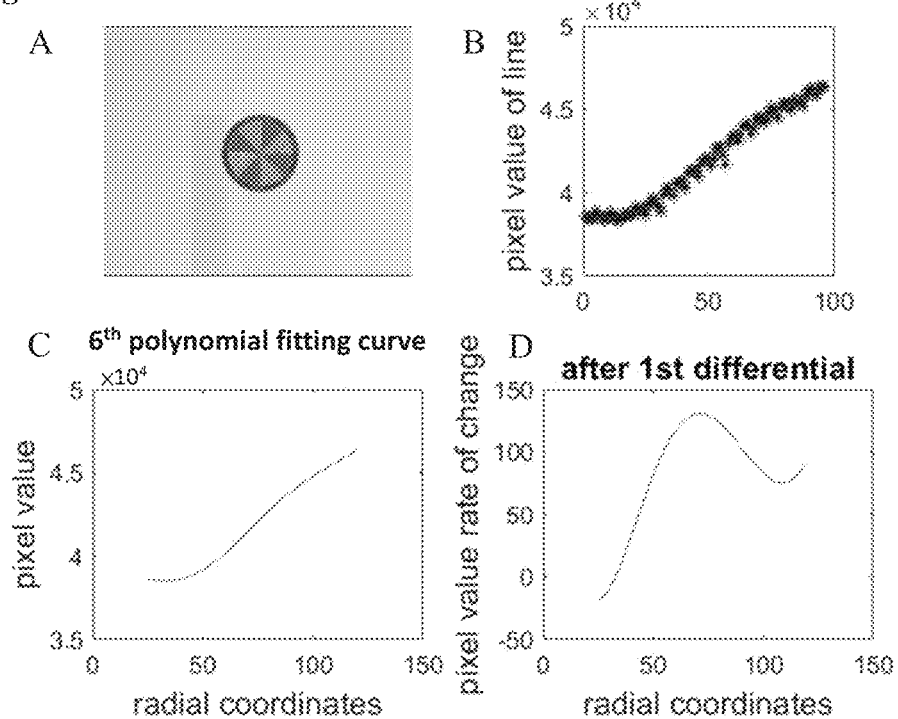
FIG. 13 shows the analysis of 8th straight line for size of fuzzy zone. (A) star pattern image, (B) pixel value of 8th straight line, (C) sextic polynomial regression, (D) first differential of sextic polynomial regression.
Figure 14:
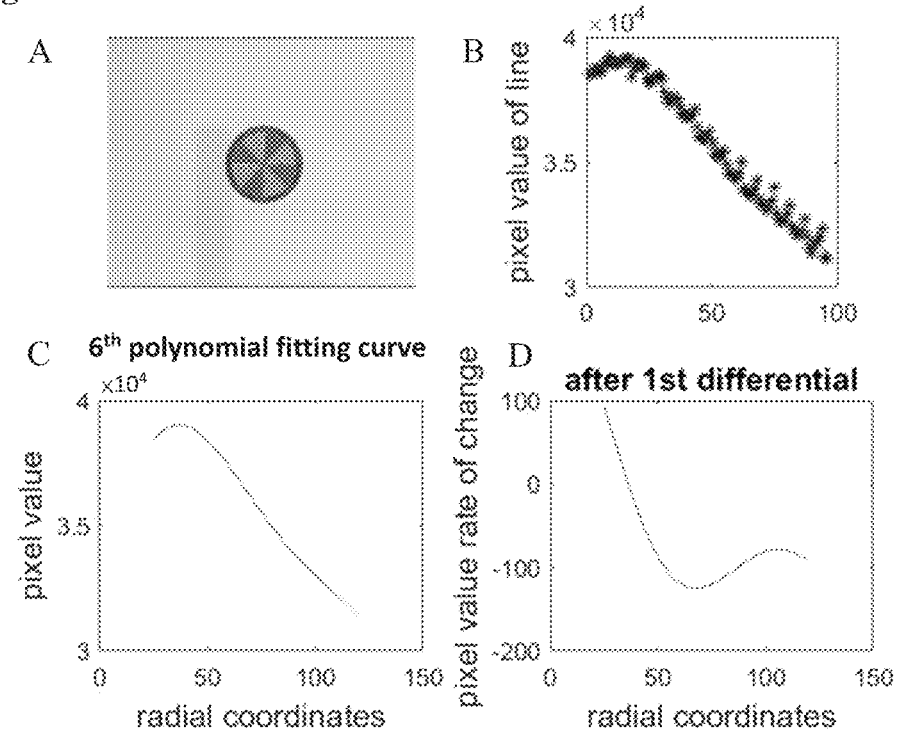
FIG. 14 shows the analysis of 9th straight line for size of fuzzy zone. (A) star pattern image, (B) pixel value of 9th straight line, (C) sextic polynomial regression, (D) first differential of sextic polynomial regression.
Figure 15:
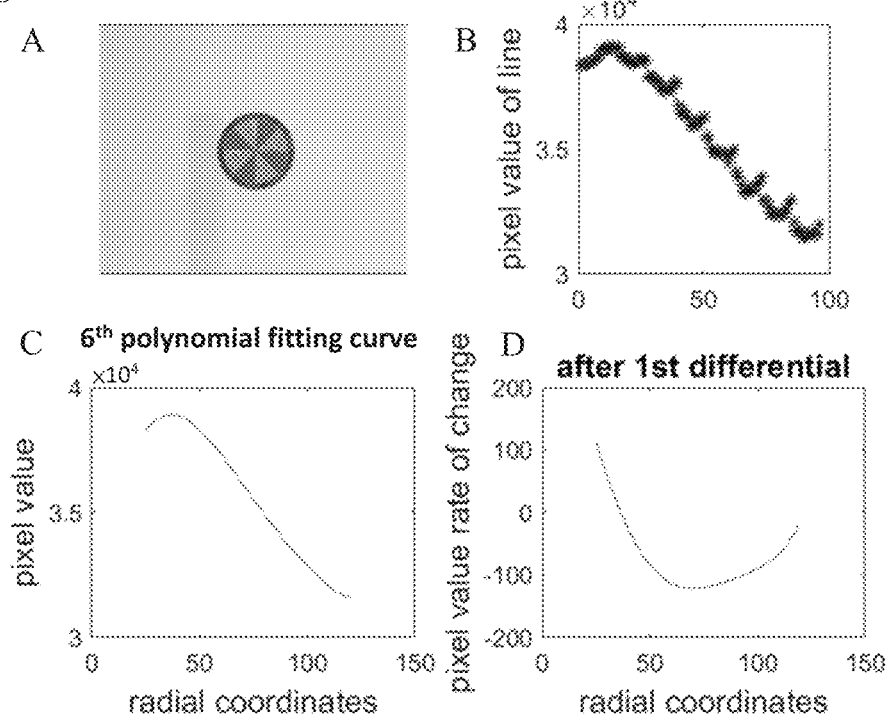
FIG. 15 shows the analysis of 10th straight line for size of fuzzy zone. (A) star pattern image, (B) pixel value of 10th straight line, (C) sextic polynomial regression, (D) first differential of sextic polynomial regression.
Figure 16:
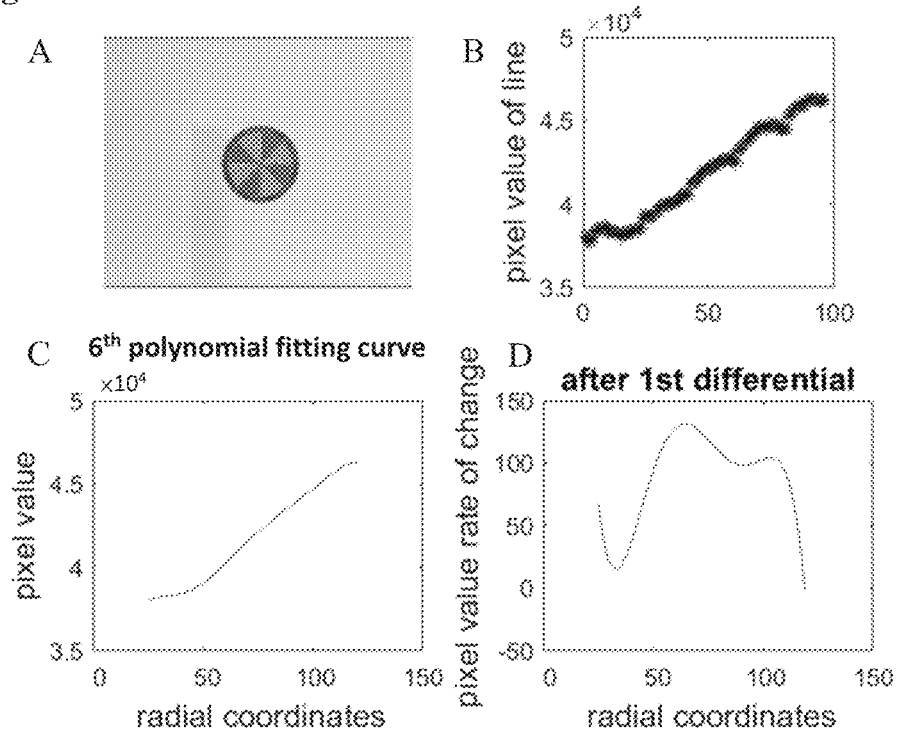
FIG. 16 shows the analysis of 11th straight line for size of fuzzy zone. (A) star pattern image, (B) pixel value of 11th straight line, (C) sextic polynomial regression, (D) first differential of sextic polynomial regression.

The process for evaluation of the focal spot sizes from a star pattern radiogram, as shown in FIG. 4, comprises:

Deploying a series of straight lines with the same length from the center of the star image, the length must span the fuzzy zone and the non-fuzzy zone. The interval angle of the straight lines can be set according to preference, and the angle of coverage is preferably at least the angle that can span the two wedge regions (as shown in FIG. 3). In a preferred embodiment, the angle of coverage is 360°.

For one of straight lines, the intensity of each pixel is read along radial coordinate, then a threshold is applied to convert the grayscale pixels to binary pixels (black and white), The pixel values can be obtained by counting the black dots and ignoring the white dots, and then the scatter diagrams of pixel value versus radial coordinate are plotted (FIGS. 6B to 15B).

A fitting curve is then drawn by applying a linear or non-linear regression in above scatter diagram. In a preferred embodiment, polynomial regression is adopted. Herein, the method is illustrated by a sextic (sixth degree) polynomial regression, but is not intended to be limited thereto.

When performing regression, the outliers can be excluded by setting an MSE threshold.

A first order differentiation of the said sextic polynomial equation is utilized for determination of size of fuzzy zone.

The position of local maximum and minimum of the first order differential function indicates the boundary of the fuzzy zone and provides focal spot size Z when the total number of local maximum and minimum is 1. However, when the total number of local maximum and minimum is not 1, the correct boundary of the fuzzy zone cannot be provided, another straight line is selected and the process is repeated.

The focal spot size can be obtained using formula I:

$$\text{Focal spot size}(f) = (\theta/57.3) \ast [(Z \ast R)/(M-1)] \quad (I)$$

wherein, Z is the size of fuzzy zone; θ is the vertex angle of star pattern, R is the pixel size of detector; M is the magnification (SID/SOD).

The above steps can be repeated on each straight line to obtain the focal spot size in different directions.

FIG. 6 to FIG. 16 show the results of the algorithm, where the MSE threshold is set to $8 \times 10^4$, M=1.3, θ=2, R=0.148 mm, and 11 data are obtained. The calculated focal spot sizes are 1.1537, 1.3087, 1.2054, 1.3087, 1.1881, 1.1709, 1.1537, 1.2226, 1.1709, 1.2054, and 1.1020. the average is 1.1991 (mm).

The method of the present invention can obtain calculation results faster than the conventional method and IEC 60336. In addition, this method can be used to obtain the size of fuzzy zone and focal spot size in all directions, and the average value thereof. The distribution and variation of intensity (pixel value) in the fuzzy zone and non-fuzzy zone can be observed in all directions. More importantly, this algorithm can be automated to replace cumbersome manual operations and reduce human error.

The invention claimed is:

1. A method for evaluation of the focal spot sizes from a star pattern radiogram, comprising:
   a. determining the center of the star pattern radiogram;
   b. deploying a plurality of straight lines along the radius of the star pattern radiogram;
   c. selecting one of the straight lines and reading the intensity values along the selected straight line to obtain an intensity function of radial coordinate;
   d. performing binarization on the intensity values to obtain a pixel value function of radial coordinate;
   e. performing regression on the pixel value function of radial coordinate to obtain a regression function;
   f. obtaining a first differential function from the derivative of regression function;
   g. determining local maximum and local minimum of the first differential function; if the total number of local maximum and local minimum is 1, documenting the radial coordinate of local maximum and local minimum to obtain the size of fuzzy zone (Z); if the total number of local maximum and local minimum is not 1, selecting another straight line and repeating steps (c) through (f); and
   f. obtaining a focal spot size along the direction of the final selected straight line using formula I:

$$\text{Focal spot size}(f) = (\theta/57.3) \ast [(Z \ast R)/(M-1)] \quad (I)$$

wherein Z is the size of fuzzy zone; θ is the vertex angle of star pattern, R is the pixel size of a detector for radiography; M is the image magnification.

2. The method of claim 1, further comprising the step of: repeating steps (c) to (f) to obtain focal spot sizes along various directions and an average value thereof.

3. The method of claim 1, wherein the step of performing the regression comprises excluding outliers whose mean square error (MSE) is greater than a threshold.

4. The method of claim 1, wherein the regression is linear or non-linear regression.

5. The method of claim 1, wherein the regression is polynomial regression.

6. The method of claim 5, wherein the polynomial regression is sextic polynomial regression.

* * * * *